July 3, 1973  R. C. STEWART, JR  3,743,544
FUEL CELL
Filed Dec. 16, 1970
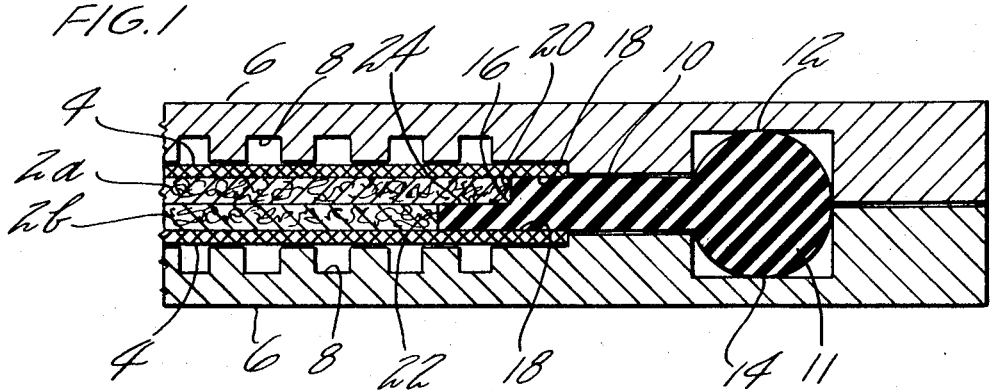
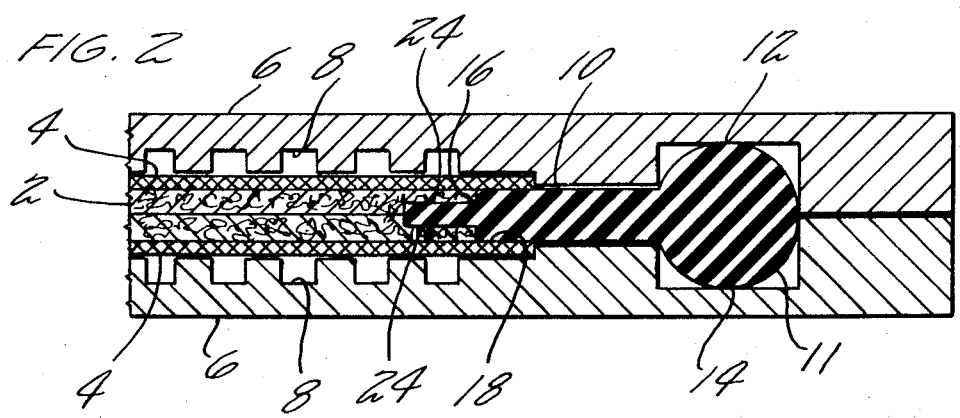
INVENTOR
ROBERT C. STEWART, JR.
BY Laurence A. Savage
ATTORNEY

3,743,544
FUEL CELL
Robert C. Stewart, Jr., West Suffield, Conn., assignor to United Aircraft Corporation, East Hartford, Conn.
Filed Dec. 16, 1970, Ser. No. 98,793
Int. Cl. H01m 27/00
U.S. Cl. 136—86 R                    5 Claims

ABSTRACT OF THE DISCLOSURE

Means for sealing and unitizing a fuel cell are provided by a seal having an integral O ring on its outer edge for sealing between two coolant plates, the seal having a step-shaped inner edge spaced from said O ring by a supporting gasket, the inner edge being in mating contiguity with the edge of the matrix.

BACKGROUND OF THE INVENTION

Field of the invention

This invention relates to fuel cells and more particularly to a method of sealing fuel cells.

Description of the prior art

Heretofore, fuel cells were sealed with a separate O ring, which was not attached to the gas manifold or to the cooling plates, with a metal/elastomer seal which was integrally bonded to the plates or manifolds or with flat gaskets. The separate O ring formed an effective seal but was difficult to assemble into a fuel cell stack, resulting in high assembly costs and poor reliability if improperly assembled. The cost of metal/elastomer seal is so great that it has been eliminated from consideration in inexpensive fuel cell designs. The flat gasket seal presents assembly problems and is not an effective seal unless the fuel cell is excessively tightened. None of the methods known heretofore provide support for electrodes or matrices, which had to be held in the desired configuration by bosses or lugs on the coolant plates. The fuel cells were difficult to assemble and components were able to slip out of the desired configuration before the stack of fuel cells was locked into position. My invention obviates these difficulties.

SUMMARY OF THE INVENTION

It is an object of the present invention to provide means for sealing and unitizing fuel cells which enables electrodes and matrix to be made up as subassemblies, which may be stored until required.

It is another object of the present invention to provide means for sealing and unitizing fuel cells which fixes the relationship of cell components to one another and prevents shifting and misalignment during the assembly of a fuel cell stack.

It is another object of the present invention to provide means for sealing and unitizing fuel cells which increases the reliability of the seal and decreases the probability that a seal will fail due to improper assembly or misalignment and at a lower cost than those methods employed heretofore.

The above and other objects are attained by an O ring which is formed as an integral part of a supporting gasket which is placed between the electrodes of the cell at their outer edges.

In further accord with the present invention the electrodes are bonded directly to the supporting gasket with a suitable adhesive, and the electrolyte matrix is step-shaped to provide a gas cross-over barrier.

The foregoing and other objects, features and advantages of the present invention will become more apparent in light of the following detailed description of a preferred embodiment thereof, as illustrated in the accompanying drawings.

DESCRIPTION OF THE DRAWINGS

FIG. 1 is a partial sectional view of a fuel cell assembly utilizing the sealing and unitizing means of the present invention.

FIG. 2 is a partial sectional view of a fuel cell assembly utilizing another embodiment of the sealing and unitizing means of the present invention.

DESCRIPTION OF THE PREFERRED EMBODIMENT

Referring to FIG. 1, there is shown a fuel cell assembly sealed and unitized in accordance with the present invention. A matrix 2, which may be one-piece or two-piece, as shown, is bounded on each side by electrodes 4. Coolant plates 6 abut the electrodes 4 and contain passages 8 for gases. One of the electrodes 4 may be an oxygen electrode and the other may be a hydrogen electrode, and the gas passages 8 may be respectively, oxygen passages and hydrogen passages.

A seal 10 with an integral O ring 11 is disposed adjacent the end of the matrix 2 and provides gas sealing surfaces at 12 and 14 between the coolant plates 6 and the O ring 11. The other end of the seal 10 is step-shaped at 16 to provide a gas cross-over barrier. Were it not for the step, it would be possible for the fuel gas for example, to flow from the fuel electrode to the oxygen electrode at the interface between the seal 10 and the matrix at surfaces 20 and 22. The step, however, prevents gas crossover because gas will not flow thorugh the matrix as long as it is saturated with electrolyte.

The seal 10 may be bonded directly to the electrodes 4 at surfaces 18 and the matrix 2 at surfaces 20, 22 and 24 with a suitable rubber-type adhesive which may be, for example, a butyl, neoprene, fluorocarbon or other type rubber which is compatible with the particular electrolyte employed in the fuel cell. Some designs may call for the matrix to float or slide on surface 24. The step shape 16 of the seal 10 prevents gas cross-over because, while gas could flow along surface 20 or 22 from its respective electrode, in a direction perpendicular to the matrix 2, the gas will not flow along the matrix 2. In other words, the gas will not flow through the matrix in a direction parallel to the electrodes because the coolant plates 6 exert pressure on the electrodes 4 and subsequently pinch the matrix 2 in the area of the step surface 24. As the matrix 2 is compressed in this area it is made more dense, its mean pore size is reduced and in turn offers much higher resistance to the passage of gas than does uncompressed matrix.

The seal 10 with its integral O ring may be made of any suitable low compression set, liquid impervious elastomeric or plastic polymers such as the butyl, neoprene or fluorocarbon rubbers, for example.

The matrix 2 may be made from phenolic fiber, silica fiber, tantalum or polytetrafluoroethylene cloth, or any other compressible type matrix material known in the art, the only requirement being that the material selected is compatible with the particular electrolyte utilized in the electrochemical cell.

The electrodes 4 may be of the carbon paper or sintered metal types, or any of the other types of electrodes known in the electrochemical cell art.

Referring to FIG. 2 where like numerals refer to like components, a similar seal 10 with an integral O ring 11 is shown. This embodiment has a different shaped step 16. In operation, it seals in the same manner as the seal shown in FIG. 1 and described heretofore.

There has thus been described a preferred embodiment of a seal for a fuel cell in accordance with the present invention. It should be understood by those skilled in the art that while specific embodiments have been utilized herein to teach my invention, various changes and omissions in the form and detail of the seal and material, for example, may be made therein without departing from the spirit and scope of the invention.

What I claim as novel and desire to secure by Letters Patent of the United States is:

1. An electrochemical cell, comprising:
   a first electrode;
   a second electrode;
   a matrix disposed between said first and second electrodes;
   a first coolant plate disposed adjacent said first electrode having a portion extending beyond the outward edge of said first electrode, including a recess in said extended portion for receiving an O ring seal;
   a second coolant plate disposed adjacent said second electrode having a portion extending beyond the outward edge of said second electrode, including a recess in said extended portion for receiving an O ring seal;
   a seal having an integral O ring on its outer edge, said O ring being disposed between said first and second coolant plates in said recesses therefor, said seal having a step-shaped inner edge spaced from said O ring by a supporting gasket having a smaller cross-sectional height than said O ring and said step-shaped inner edge being in mating contiguity with the edge of said matrix, said matrix having a portion extending outwardly beyond the innermost edge of said seal.

2. An electrochemical cell as defined in claim 1, wherein the supporting gasket of said seal is bonded to said electrodes with an adhesive selected from the group consisting of butyl, neoprene and fluorocarbon rubbers.

3. An electrochemical cell as defined in claim 2, additionally wherein said step-shaped inner edge of said seal is bonded to said matrix.

4. An electrochemical cell as defined in claim 1, wherein said integral seal is made from a low compression set, liquid impervious elastomeric or plastic polymer.

5. An electrochemical cell as defined in claim 1, wherein said step-shaped inner edge comprises at least one surface parallel to the electrodes.

References Cited
UNITED STATES PATENTS

| | | | |
|---|---|---|---|
| 3,436,272 | 4/1969 | Gelting | 136—86 R |
| 3,126,302 | 3/1964 | Drushella | 136—86 R |

SAMUEL ROTHBERG, Primary Examiner

R. I. SMITH, Assistant Examiner

U.S. Cl. X.R.

277—225